United States Patent
Jaradi et al.

(10) Patent No.: US 10,829,015 B2
(45) Date of Patent: Nov. 10, 2020

(54) VEHICLE SEAT ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 181 days.

(21) Appl. No.: 16/157,438

(22) Filed: Oct. 11, 2018

(65) Prior Publication Data
US 2020/0114788 A1  Apr. 16, 2020

(51) Int. Cl.
*B60N 2/427* (2006.01)
*B60N 2/70* (2006.01)

(52) U.S. Cl.
CPC ....... *B60N 2/4279* (2013.01); *B60N 2/42709* (2013.01); *B60N 2/7094* (2013.01)

(58) Field of Classification Search
CPC ............ B60N 2/427; B60N 2/42727; B60N 2/42754; B60N 2/42772; B60N 2/42781; B60N 2/4279; B60N 2/42709
USPC ....................................................... 296/68.1
See application file for complete search history.

(56) References Cited

U.S. PATENT DOCUMENTS

| | | | |
|---|---|---|---|
| 4,738,485 A * | 4/1988 | Rumpf | B60N 2/4221 280/806 |
| 5,125,472 A * | 6/1992 | Hara | B60N 2/4221 180/271 |
| 5,492,368 A * | 2/1996 | Pywell | B60R 22/1952 180/282 |
| 5,908,219 A | 6/1999 | Bohmler | |
| 6,050,635 A * | 4/2000 | Pajon | B60N 2/4221 297/216.1 |
| 6,254,181 B1 | 7/2001 | Aufrere et al. | |
| 6,604,599 B2 * | 8/2003 | Yamaguchi | B60N 2/4221 180/271 |
| 6,742,838 B1 | 6/2004 | Swierczewski | |
| 6,746,077 B2 | 6/2004 | Klukowski | |
| 8,109,568 B2 | 2/2012 | Masutani | |
| 8,113,575 B2 * | 2/2012 | Masutani | B60N 2/42763 297/216.1 |
| 2018/0208087 A1* | 7/2018 | Baba | B60N 2/427 |
| 2019/0106023 A1* | 4/2019 | Kitagawa | B60N 2/0232 |
| 2019/0106027 A1* | 4/2019 | Jonsson | B60N 2/427 |
| 2019/0106028 A1* | 4/2019 | Kitagawa | B60N 2/62 |

FOREIGN PATENT DOCUMENTS

| | | | |
|---|---|---|---|
| DE | 3631881 C2 | 4/1990 | |
| FR | 2847862 A1 * | 6/2004 | B60N 2/4279 |
| JP | 4282838 B2 | 6/2009 | |

* cited by examiner

*Primary Examiner* — Hilary L Gutman
(74) *Attorney, Agent, or Firm* — Frank A. MacKenzie; Bejin Bieneman PLC

(57) ABSTRACT

A seat assembly includes a frame and a plurality of support members, each support member having ends spaced along a seat-longitudinal axis and connected to the frame. The seat assembly includes a cross-member fixed relative to the support members. The seat assembly includes a pyrotechnic device designed to move the cross-member and the plurality of support members to a downward position.

20 Claims, 5 Drawing Sheets

VEHICLE SEAT ASSEMBLY

BACKGROUND

A vehicle includes a seat assembly. Components of the seat assembly may change position to control kinematics of an object disposed on the seat assembly. For example, a position of a seat bottom of the seat assembly may change to control the object during a vehicle impact.

BRIEF DESCRIPTION OF THE DRAWINGS

FIG. 3A is a close up of a portion of FIG. 3.
FIG. 4A is a close up of a portion of FIG. 4.

DETAILED DESCRIPTION

Figure 1:
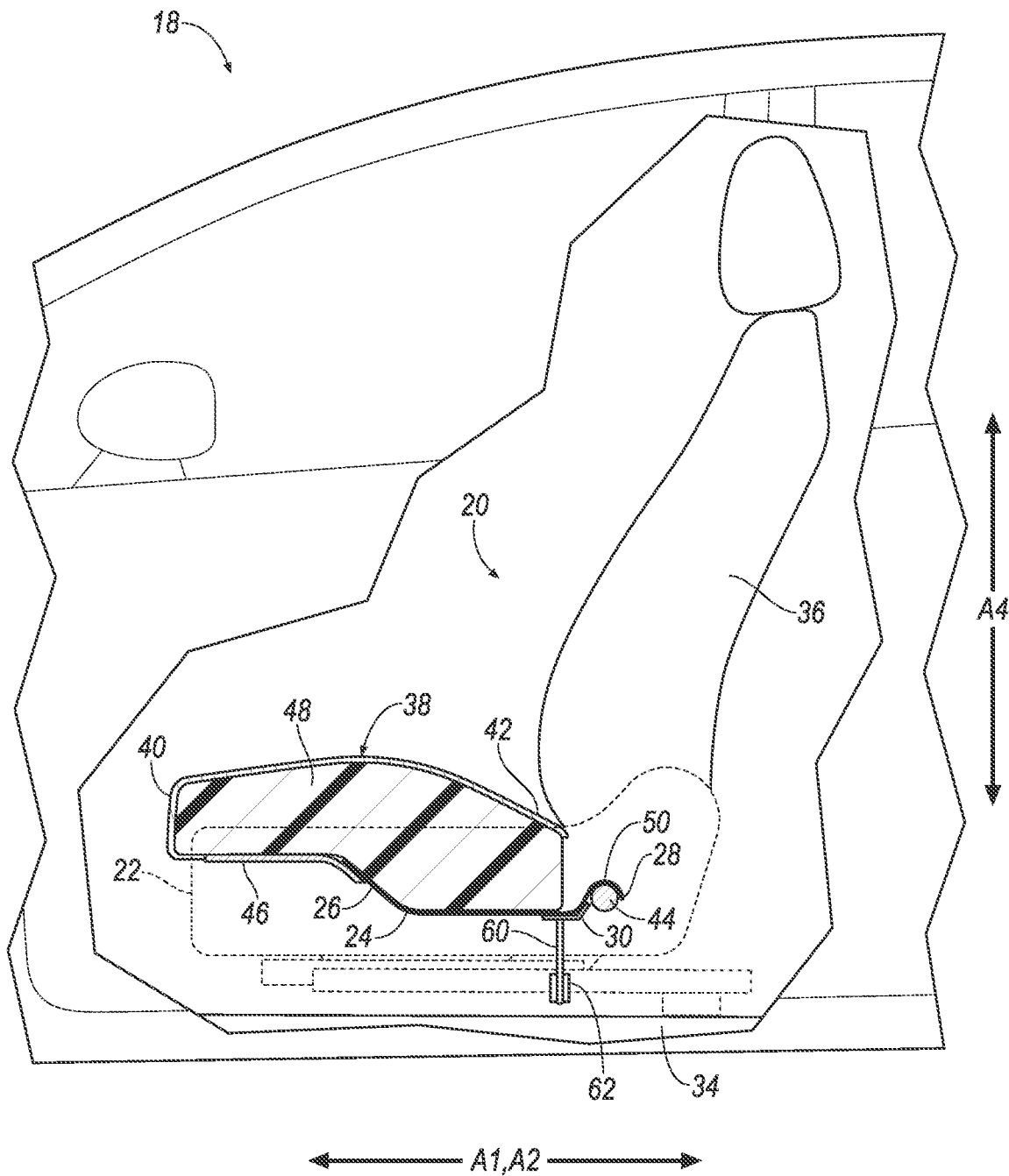
FIG. 1 is a side view of a vehicle having a seat assembly.

A seat assembly includes a frame and a plurality of support members, each support member having ends spaced along a seat-longitudinal axis and connected to the frame. The seat assembly includes a cross-member fixed relative to the support members. The seat assembly includes a pyrotechnic device designed to move the cross-member and the plurality of support members to a downward position.

The support members may be elongated along the seat-longitudinal axis.

The support members may be springs.

The frame may include a cross-bar, the ends supported by the cross-bar.

The ends may be spaced from the cross-bar when the support members are in the downward position.

The ends may include hooks engaged with the cross-bar.

The hooks may be disengaged from the cross-bar when the support members are in the downward position.

The seat assembly may include a seatback, the cross-member proximate the seatback.

The seat assembly may include a pan, the support members extending rearward from the pan.

The seat assembly may include a cable connecting the pyrotechnic device to the cross-member.

The seat assembly may include a pulley operatively engaged with the cable.

The cable may extend along a cross-seat axis.

The cross-member may be elongated along a cross-seat axis.

The seat assembly may include a cushion supported by the support members.

A vehicle includes a floor and a seat frame supported by the floor. The vehicle includes a plurality of support members, each support member having ends spaced along a seat-longitudinal axis and connected to the seat frame. The vehicle includes a cross-member fixed relative to the support members. The vehicle includes a pyrotechnic device designed to move the cross-member and the plurality of support members toward the floor.

The vehicle may include a processor and a memory storing instructions executable by the processor to actuate the pyrotechnic device in response to detecting a vehicle impact.

The seat frame may include a cross-bar, the ends supported by the cross-bar.

The pyrotechnic device may be designed to move the plurality of support members to a downward position, the ends of the support members spaced from the cross-bar in the downward position.

The ends may include hooks engaged with the cross-bar.

The pyrotechnic device may be designed to move the plurality of support members to a downward position, the hooks disengaged from the cross-bar in the downward position.

With reference to the Figures, wherein like numerals indicate like parts throughout the several views, a seat assembly 20 for a vehicle 18 includes a seat frame 22. The seat assembly 20 includes a plurality of support members 24, each support member 24 having a first end 26 and a second end 28 spaced along a seat-longitudinal axis A1 and connected to the seat frame 22. The seat assembly 20 includes a cross-member 30 fixed relative to the support members 24. The seat assembly 20 includes a pyrotechnic device 32 designed to move the cross-member 30 and the plurality of support members 24 to a downward position. Moving the cross-member 30 and the plurality of support members 24 to the downward position with the pyrotechnic device 32 controls kinematics of an object on the seat assembly 20, e.g., during a vehicle impact. For example, moving the cross-member 30 and the plurality of support members 24 to the downward position may lower such object on the seat relative to a seatbelt assembly, one or more airbags, etc., of the vehicle 18. The adjectives "first" and "second" are used throughout this document as identifiers and are not intended to signify importance or order The vehicle 18 may be any type of passenger or commercial automobile such as a car, a truck, a sport utility vehicle, a crossover vehicle, a van, a minivan, a taxi, a bus, etc.

The vehicle 18 may define a longitudinal axis A2, e.g., extending between a front and a rear of the vehicle 18. The vehicle 18 may define a cross-vehicle axis A3, e.g., extending between a left side and a right side of the vehicle 18. The vehicle 18 may define a vertical axis A4, e.g., extending between a top and a bottom of the vehicle 18. The longitudinal axis A2, the cross-vehicle axis A3, and the vertical axis A4 may be perpendicular to each other. The front, rear, left and right sides, top, bottom, etc., may be relative to an orientation of an occupant of the vehicle 18. The front, rear, left and right sides, top, bottom, etc., may be relative to an orientation of controls for operating the vehicle 18, e.g., an instrument panel. The front, rear, left and right sides, top, bottom, etc., may be relative to a driving direction of the vehicle 18 when wheels of the vehicle 18 are all parallel with each other.

The vehicle 18 includes a passenger cabin. The passenger cabin includes one or more seat assemblies 20. For example, the seat assemblies 20 may be supported by a floor 34 of the vehicle 18. The seat assemblies 20 are shown as bucket seats, but the seat assemblies 20 may be other types, e.g., bench seats, etc.

The seat assembly 20 may include a seatback 36, a seat bottom 38, and a head restraint. The head restraint may be supported by the seatback 36 and may be stationary or movable relative to the seatback 36. The seat bottom 38 may extend from the seatback 36 along the seat-longitudinal axis A1. In other words, the seat-longitudinal axis A1 may extend between a front 40 and a rear 42 of the seat bottom 38. The seat-longitudinal axis A1 may be parallel to the longitudinal axis A2. The seatback 36 may be supported by the seat bottom 38, e.g., at the rear 42 of the seat bottom 38, and may be stationary or movable relative to the seat bottom 38. The seatback 36, the seat bottom 38, and/or the head restraint may be adjustable in multiple degrees of freedom. Specifically, the seatback 36, the seat bottom 38, and/or the head restraint may themselves be adjustable, in other words, adjustable components within the seatback 36, the seat bottom 38, and/or the head restraint, and/or may be adjustable relative to each other.

The seat frame 22 may include tubes, beams, etc. The seat frame 22 may be any suitable plastic material, e.g., carbon fiber reinforced plastic (CFRP), glass fiber-reinforced semi-finished thermoplastic composite (organosheet), etc. As another example, some or all components of the seat frame 22 may be any suitable metal, e.g., steel, aluminum, etc. The seat frame 22 may be supported by the floor 34. For example, the seat frame 22 may be slidably supported by a track fixed to the floor 34. Movement of the seat frame 22 along the track may enable movement of the seat assembly 20 within the passenger compartment, e.g., relative to the floor 34 and along the longitudinal axis A2.

The seat frame 22 may include a cross-bar 44. The cross-bar 44 may be elongated along a cross-seat axis A5 that is perpendicular to the seat-longitudinal axis A1. For example, the cross-seat axis A5 may extend between a right side and a left side of the seat assembly 20. The cross-seat axis A5 may be parallel with the cross-vehicle axis A3. The cross-bar 44 may be at the rear 42 of the seat bottom 38, e.g., closer to the rear 42 than the front 40 of the seat bottom 38. The cross-bar 44 may be tubular, or any suitable shape.

The seat frame 22 may include a pan 46. The pan 46 may be generally flat. The pan 46 may be at the front 40 of the seat bottom 38, e.g., closer to the front 40 than the rear 42 of the seat bottom 38. The pan 46 may extend from the front 40 of the seat bottom 38 toward the rear 42 of the seat bottom 38. The pan 46 may extend between the right side and the left side of the seat assembly 20.

The plurality of support members 24 may support an object on the seat assembly 20. For example, the support members 24 may support a cushion 48 and the object may be on the cushion 48. The support members 24 and/or the cushion 48 isolate motion of the vehicle 18 from the object on the seat assembly 20, e.g., making the seat assembly 20 more comfortable to sit on. For example, the support members 24 may be springs, such as an elastic steel having a S-shape, and the cushion 48 may be foam.

Each support member 24 has ends 26, 28. The support members 24 may be elongated between the ends 26, 28. The ends 26, 28 are spaced along the seat-longitudinal axis A1. For example, the support members 24 may be elongated along the seat-longitudinal axis A1. In other words, the support members 24 may be longer along the seat-longitudinal axis A1 than along the cross-seat axis A5.

The first end 26 of each support member 24 is connected to the seat frame 22. For example, the first ends 26 may be connected to the seat frame 22 with one or more intermediary members, e.g., linkages, etc. As another example, the first ends 26 may be fixed directly to the seat frame 22, e.g., via a fastener, welding, clip, etc. For example, the first ends 26 may be fixed to the pan 46. The support members 24 may extend rearward from the pan 46. In other words, the support members 24 may extend from the pan 46 toward the rear 42 of the seat bottom 38, e.g., along the seat-longitudinal axis A1.

The second ends 28 may include hooks 50. For example, the second ends 28 may curve toward the first ends 26 and form an open loop. As another example, the second ends 28 may be J-shaped.

The second ends 28 of the support members 24 may be supported by the cross-bar 44. For example, the second ends 28 may be connected to the cross-bar 24 with one or more intermediary members, e.g., linkages, etc. As another example, the second ends 28 may rest on the cross-bar 24, e.g., held in place by gravity. As yet another example, the second ends 28 may be fixed directly to the cross-bar 44 via fastener, welding, etc. As one more example, the hooks 50 of the second ends 28 may be engaged with the cross-bar 44. In other words, the hooks 50 may wrap around the cross-bar 44. For example, the open loop of the hooks 50 may surround the cross-bar 44, the hooks 50 may be disposed in holes of the cross-bar 44 (not shown), etc.

The cross-member 30 transfers force to the support members 24, e.g., from the pyrotechnic device 32. The cross-member 30 may be elongated along the cross-seat axis A5. The cross-member 30 is fixed relative to the support members 24. For example, the cross-member 30 may be fixed to the support members 24 via fastener, welding, etc. The cross-member 30 may be proximate the seatback 36. For example, the cross-member 30 may be closer to the seatback 36 than the front 40 the of seat bottom 38. The cross-member 30 may be proximate the cross-bar 44. For example, the cross-member 30 may be closer to the cross-bar 44 than the pan 46. The cross-member 30 may be proximate the second ends 28 of the support members 24. For example, the cross-member 30 may be closer to the second ends 28 than the first ends 26. The cross-member 30 proximate the seatback 36, cross-bar 44, and/or second ends 28 concentrates forces applied to the support members 24 from the cross-member 30 at the second ends 28.

Figure 2:
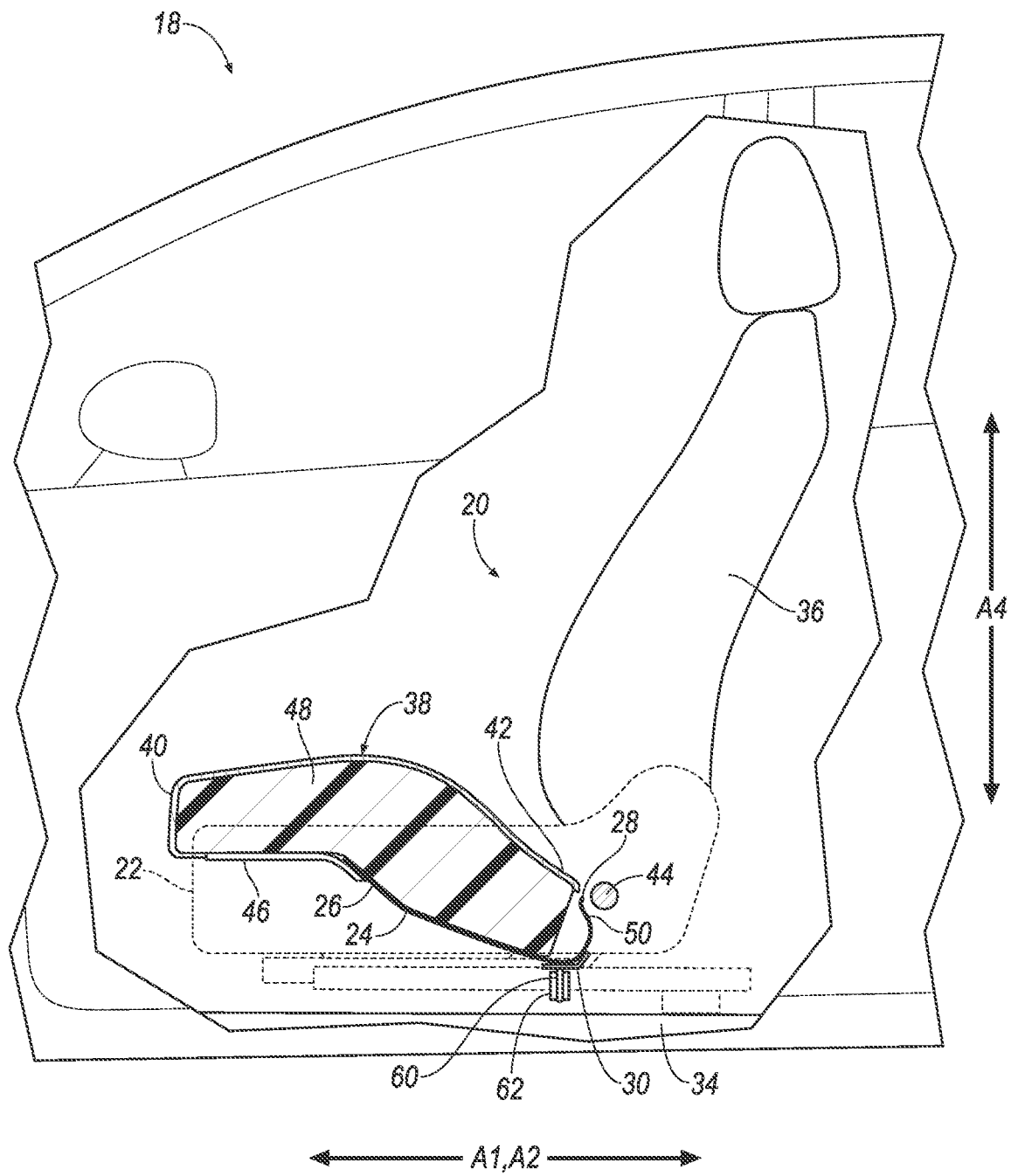
FIG. 2 is a side view of the vehicle having the seat assembly in a downward position.
Figure 3:
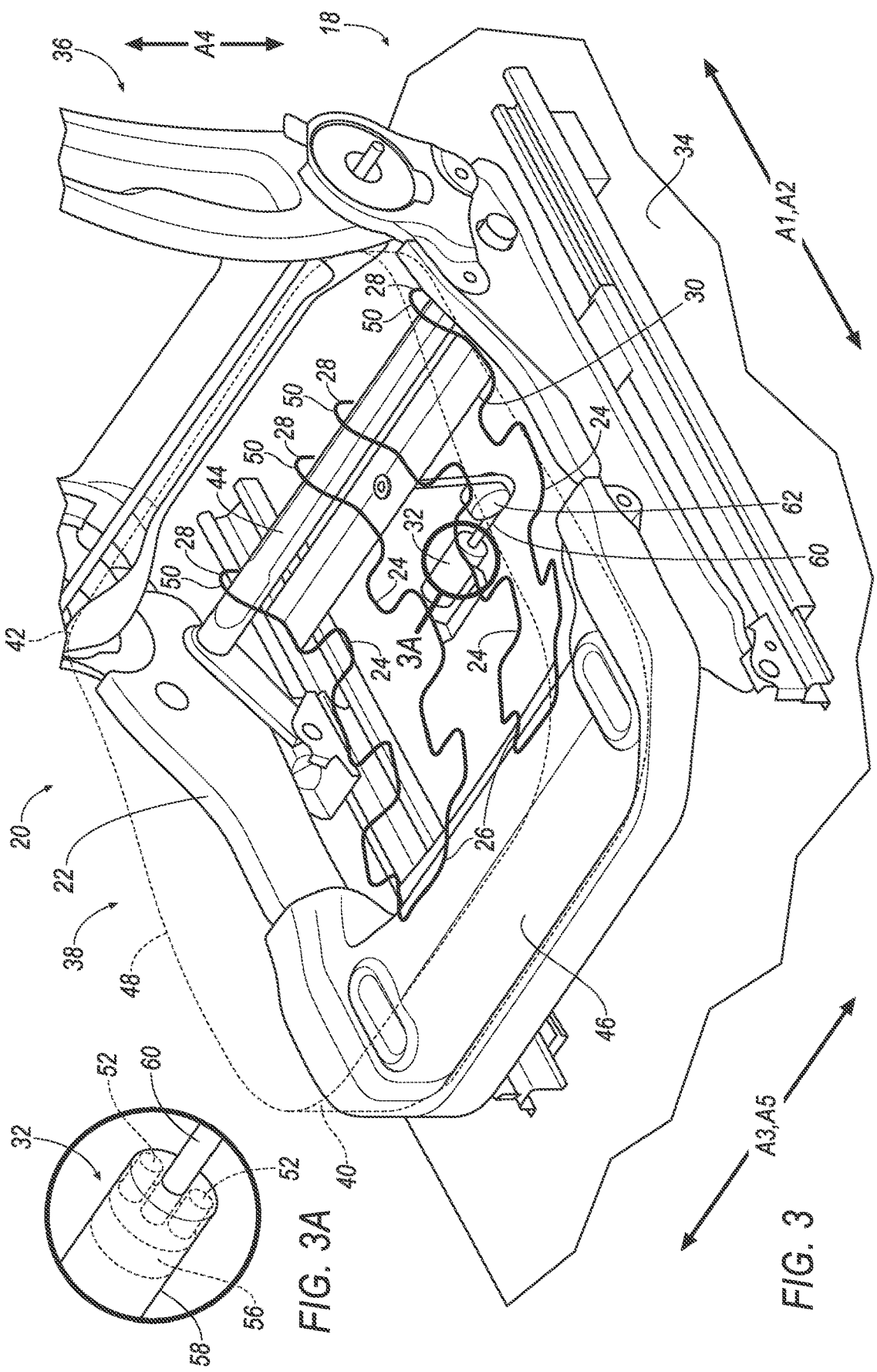
FIG. 3 is a perspective view of the vehicle having the seat assembly.
Figure 4:
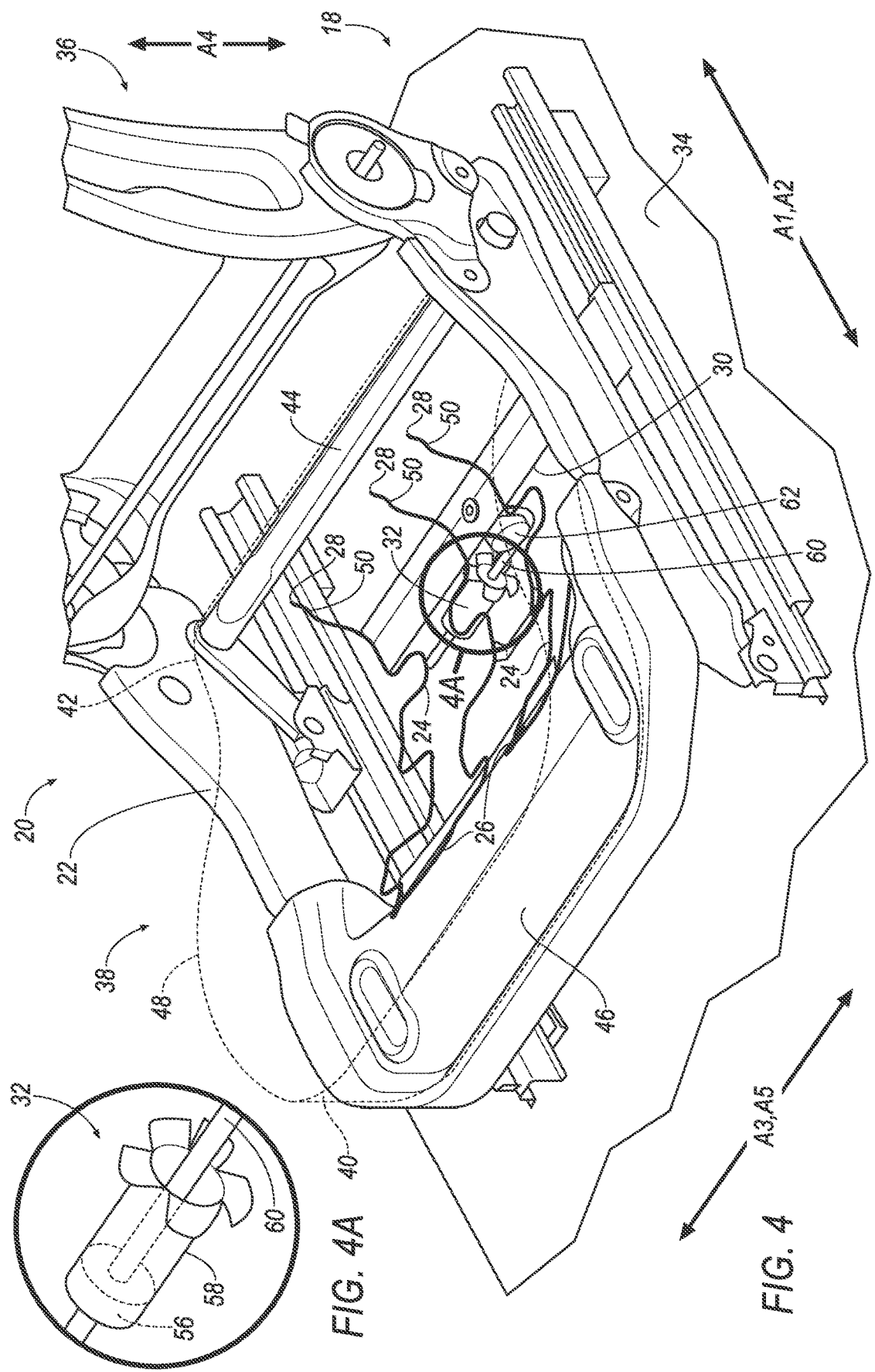
FIG. 4 is a perspective view of the vehicle having the seat assembly in the downward position.
Figure 5:
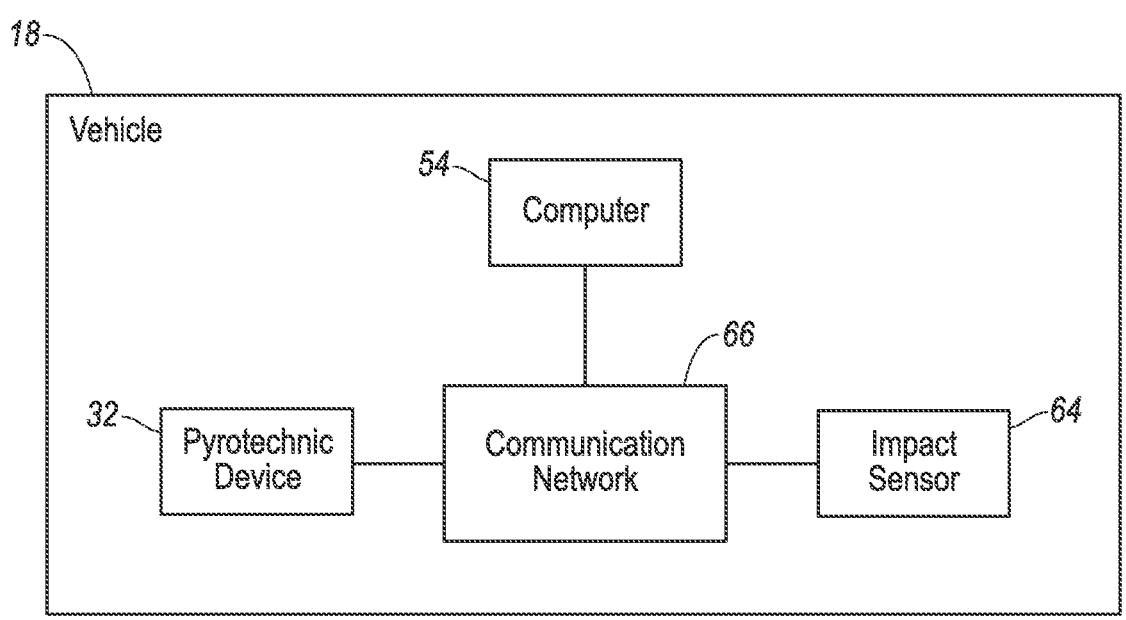
FIG. 5 is a block diagram of components of the vehicle.

The pyrotechnic device 32 includes pyrotechnic material 52 that detonates upon actuation, e.g., upon receipt of a command, such as an electrical pulse, from a computer 54. The pyrotechnic device 32 may be supported by the floor 34, the seat frame 22, or any suitable location on the vehicle 12 or seat assembly 20. The pyrotechnic device 32 is designed to move the cross-member 30, the support members 24, and/or the cushion 48 from a normal position, shown in FIGS. 1 and 3, to a downward position, shown in FIGS. 2 and 4. The cross-member 30, the support members 24, and/or the cushion 48 in the downward position are closer to the floor 34 than in the normal position. In other words, the pyrotechnic device 32 is designed to move the cross-member 30, the support members 24, and/or the cushion 48 toward the floor 34.

For example, the pyrotechnic device 32 may include a piston 56 disposed within a cylinder 58. The pyrotechnic material 52 may be in the cylinder 58. Upon detonation, the pyrotechnic material 52 may urge the piston 56 to move relative to the cylinder 58. The pyrotechnic device 32 may be orientated such that the piston 56 moves along the cross-seat axis A5. A cable 60 may connect the pyrotechnic device 32 to the cross-member 30, e.g., one end of the cable 60 may be fixed relative to the piston 56 and an opposite end of the cable 60 may be fixed relative to the cross-member 30. A pulley 62 may operatively engage with the cable 60, e.g., to redirect force generated along the cross-seat axis A5 by the piston 56 to force along the vertical axis A4 to move the cross-member 30 toward the floor 34. For example, the cable 60 may extend along the cross-seat axis A5, e.g., between the pyrotechnic device 32 and the pulley 62, and extend along the vertical axis A4, e.g., between the pulley 62 and the cross-member 30.

The second ends 28 of the support members 24 may be spaced from the cross-bar 44 when the support members 24 are in the downward position. For example, the hooks 50 may be disengaged from the cross-bar 44 when the support members 24 are in the downward position. The hooks 50 may disengage by flexing until the hooks 50 separate from the cross-bar 44. As another example, the fastener, weld, etc., fixing the second ends 28 to the cross-bar 44 may fracture or otherwise cease from securing the second ends 28 to the cross-bar 44.

The vehicle 18 may include an impact sensor 64. The impact sensor 64 is programmed to detect an impact to the vehicle 18. The impact sensor 64 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 64 may be located at numerous points in or on the vehicle 18.

The vehicle 18 may include a communication network 66. The communication network 66 includes hardware, such as a communication bus, for facilitating communication among vehicle components, e.g., the pyrotechnic device 32, the impact sensor 64, the computer 54, etc. The communication network 66 may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 54 may be a microprocessor-based computing device implemented via circuits, chips, or other electronic components. For example, the computer 54 may include a processor, memory, etc. The memory of the controller may store instructions executable by the processor as well as data and/or databases.

The memory may store instructions executable by the processor to actuate the pyrotechnic device 32 in response to detecting a vehicle impact. For example, the computer 54 may detect a vehicle impact based on data received from the impact sensor 64 via the communication network 66. Then, the computer 54 may transit an instruction, such as an electric pulse, to the pyrotechnic device 32, e.g., via the communication network 66. Upon receiving the instruction, the pyrotechnic device 32 may actuate and detonate the pyrotechnic material 52, causing the support members 24, the cross-member 30, and/or the cushion 48 to move toward the floor 34 to the downward position. Moving the support members 24, the cross-member 30, and/or the cushion 48 to the downward position controls kinematics of an object on the seat assembly 20. For example, moving the support members 24, the cross-member 30, and/or the cushion 48 to the downward position may reposition a crash test dummy seated on the seat assembly 20 relative to a seatbelt assembly and improve results of crash testing the vehicle 18.

Computing devices, such as the computer 54, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat assembly, comprising:
   a frame;
   a plurality of support members, each support member having ends spaced along a seat-longitudinal axis and connected to the frame;
   a cross-member translatable relative to the frame and fixed relative to the support members; and
   a pyrotechnic device designed to apply a downward force to the cross-member to translate the cross-member and the plurality of support members to a downward position.

2. The seat assembly of claim 1, wherein the support members are elongated along the seat-longitudinal axis.

3. The seat assembly of claim 1, wherein the support members are springs.

4. The seat assembly of claim 1, wherein the frame includes a cross-bar, the ends supported by the cross-bar.

5. The seat assembly of claim 4, wherein the ends are spaced from the cross-bar when the support members are in the downward position.

6. The seat assembly of claim 4, wherein the ends include hooks directly engaged with the cross-bar.

7. The seat assembly of claim 6, wherein the hooks are disengaged from the cross-bar when the support members are in the downward position.

8. The seat assembly of claim 1, further comprising a seatback, the cross-member proximate the seatback.

9. The seat assembly of claim 1, further comprising a pan, the support members extending rearward from the pan.

10. The seat assembly of claim 1, further comprising a cable connecting the pyrotechnic device to the cross-member.

11. The seat assembly of claim 10, further comprising a pulley operatively engaged with the cable between the cross-member and the pyrotechnic device, the pulley spaced from the pyrotechnic device and the cable extending upwardly from the pulley to the cross-member.

12. The seat assembly of claim 11, wherein the cable extends along a cross-seat axis from the pyrotechnic device to the pulley and extends along a vertical axis from the pulley to the cross-member.

13. The seat assembly of claim 11, wherein the cross-member is elongated between the pyrotechnic device and the pulley along a cross-seat axis.

14. The seat assembly of claim 1, further comprising a cushion supported by the support members.

15. A vehicle, comprising:
a floor;
a seat frame supported by the floor;
a plurality of support members, each support member having ends spaced along a seat-longitudinal axis and connected to the seat frame;
a cross-member translatable relative to the seat frame and fixed relative to the support members; and
a pyrotechnic device designed to apply force to the cross member, the force translating the cross-member and the plurality of support members toward the floor.

16. The vehicle of claim 15, further comprising a processor and a memory storing instructions executable by the processor to actuate the pyrotechnic device in response to detecting a vehicle impact.

17. The vehicle of claim 15, wherein the seat frame includes a cross-bar, the ends supported by the cross-bar.

18. The vehicle of claim 17, wherein the pyrotechnic device is designed to move the plurality of support members to a downward position, the ends of the support members spaced from the cross-bar in the downward position.

19. The vehicle of claim 17, wherein the ends include hooks directly engaged with the cross-bar.

20. The vehicle of claim 19, wherein the pyrotechnic device is designed to move the plurality of support members to a downward position, the hooks disengaged from the cross-bar in the downward position.

* * * * *